United States Patent
Neidhöfer et al.

(10) Patent No.: US 11,905,344 B2
(45) Date of Patent: Feb. 20, 2024

(54) PROPYLENE COPOLYMER COMPOSITIONS SUITABLE FOR FOAMING

(71) Applicant: Lummus Novolen Technology GmbH, Mannheim (DE)

(72) Inventors: Michael Neidhöfer, Mainz (DE); Volker Heinrich Jörres, Mannheim (DE)

(73) Assignee: Lummus Novolen Technology GmbH, Mannheim (DE)

( * ) Notice: Subject to any disclaimer, the term of this patent is extended or adjusted under 35 U.S.C. 154(b) by 645 days.

(21) Appl. No.: 16/972,706

(22) PCT Filed: Jun. 11, 2019

(86) PCT No.: PCT/EP2019/065152
§ 371 (c)(1),
(2) Date: Dec. 7, 2020

(87) PCT Pub. No.: WO2019/234256
PCT Pub. Date: Dec. 12, 2019

(65) Prior Publication Data
US 2021/0261699 A1    Aug. 26, 2021

(30) Foreign Application Priority Data
Jun. 8, 2018 (EP) ..................... 18176724

(51) Int. Cl.
*C08F 10/06* (2006.01)
*C08K 5/14* (2006.01)

(52) U.S. Cl.
CPC ............. *C08F 10/06* (2013.01); *C08K 5/14* (2013.01); *C08F 2810/10* (2013.01)

(58) Field of Classification Search
CPC ......... C08F 10/06; C08F 2810/10; C08K 5/14
USPC ....................................... 524/280
See application file for complete search history.

(56) References Cited

U.S. PATENT DOCUMENTS

| | | | |
|---|---|---|---|
| 4,578,430 A | 3/1986 | Davison | |
| 5,804,304 A * | 9/1998 | Williams | C08L 23/0815 428/394 |
| 6,620,892 B1 | 9/2003 | Bertin et al. | |
| 2005/0171284 A1* | 8/2005 | Kondo | C08F 8/50 525/192 |
| 2007/0197731 A1* | 8/2007 | Kondo | C08F 255/02 525/192 |
| 2011/0245425 A1 | 10/2011 | Han et al. | |

FOREIGN PATENT DOCUMENTS

| | | | |
|---|---|---|---|
| CN | 112638955 B | 8/2023 | |
| EP | 2371898 A2 | 10/2011 | |
| JP | 2002080609 A * | 3/2002 | ............ B29C 48/40 |
| JP | 2002080609 A | 3/2002 | |
| JP | 2002080610 A | 3/2002 | |
| JP | 2002308947 A | 10/2002 | |
| KR | 100460826 B1 | 12/2004 | |
| WO | 9927007 A1 | 6/1999 | |

OTHER PUBLICATIONS

Office Action issued in Chinese Application No. 201980052872.3, dated Aug. 25, 2022 (8 pages).
Office Action issued in Eurasian Application No. 202092942, dated Oct. 31, 2022 (7 pages).
Office Action issued in corresponding KR Application No. 10-2020-7037009 with English translation dated May 4, 2022 (17 pages).
Akzo Nobel Initiators for High Polymer, 2161 BTB Communications, Issue Jun. 2006 (17 pages).
Gotsis, A.D., et al. "The effect of long chain branching on the processability of polypropylene in thermoforming." Polymer Engineering and Science, vol. 44, No. 5, May 2004, pp. 973-982 (10 pages).
International Search Report issued in corresponding International Application No. PCT/EP2019/065152, dated Oct. 18, 2019 (4 pages).
Written Opinion issued in corresponding Internartional Application No. PCT/EP2019/065152, dated Oct. 18, 2019 (5 pages).
Office Action issued in Vietnamese Application No. 1-2020-07078, dated Aug. 28, 2023 (3 pages).

* cited by examiner

*Primary Examiner* — Hui H Chin
(74) *Attorney, Agent, or Firm* — Osha Bergman Watanabe & Burton LLP

(57) ABSTRACT

The disclosure relates to a method for producing a propylene copolymer, comprising extruding a molten propylene copolymer and a composition essentially comprising at least one peroxydicarbonate and at least one organic peroxide. Extruding is performed by extruding the propylene copolymer, adding the composition to the propylene copolymer, and melt extruding the propylene copolymer in the presence of the composition.

22 Claims, No Drawings

PROPYLENE COPOLYMER COMPOSITIONS SUITABLE FOR FOAMING

BACKGROUND OF INVENTION

Technical Field

The present disclosure relates to a method for producing a propylene copolymer as well as to propylene copolymers obtained by such a method. The propylene copolymer is suitable for a number of applications and processes, including foaming processes, such as for example injection foaming processes. However, the propylene copolymer may be used also in other applications and processes.

Background Art

Polypropylenes, such as for example polypropylenes produced with Ziegler-Natta catalysts, may have high molecular weights and broad molecular weight distributions, thus having a high melt viscosity, which is evidenced by a low Melt Flow Rate (MFR). These properties are undesired when processing propylene polymers in some product applications, such as for example molding, films and fibers applications. For example, in injection molding and injection foaming processes, the polypropylene should have a high MFR, i.e., a low melt viscosity at a given melt temperature, to facilitate filling of narrow-cavity molds, thus reducing the production cycle time. Therefore, methods have been developed for reducing the molecular weight and for narrowing the molecular weight distribution by changing the rheology of polypropylene, for example by reducing the viscosity of polypropylene in liquid phase. An increase in melt flow rate is responsible for improved flow properties of polypropylenes. This change in the rheology for improving the flow properties of polypropylenes, thus making a polypropylene more suitable for some product applications, is described as "modifying" the rheology of the polypropylene. The viscosity reduction is also described as polypropylene "visbreaking" or "degradation". Viscosity reduction is conventionally applied to polypropylene.

In the present application, rheological modification is intended to indicate any rheological modification, including "visbreaking" and cross-linking of polypropylenes, in particular propylene copolymers, which may also be accompanied by degradation side-reactions.

It is known to use organic peroxides for the rheological modification of polypropylenes.

A known process for visbreaking polyolefins is extrusion performed at a temperature of about 190° C.-260° C. in the presence of an organic peroxide compound. An example of this process is described in document AU 5141785 A, which relates to a process for the controlled reduction of average molecular weight and alteration of molecular weight distribution of C3-C8 alpha-monoolefin homopolymers or copolymers by adding a peroxide, such as such as 2,5-dimethyl-2,5-di(t-butylperoxy)hexane, continuously at a programmed cyclic rate to the polymer or copolymer and heating the mixture in a melt extruder.

Further, when processing polypropylenes by injection foaming, extrusion foaming, thermoforming, extrusion coating or blow molding, high melt strength and extensibility are desired. For example, with reference to foaming processes, if the polypropylene has a high melt strength, the walls of growing foam cells are more stable and do not collapse. Also, a finer foam morphology and thus a polypropylene foam with a lower density can be achieved, which saves material cost as well as energy.

Generally, the melt strength of polypropylene can be increased by increasing the molecular mass and/or by broadening the molecular mass distribution and/or by introducing long chain branches. In order to obtain long chain branching in polypropylene, it is known to modify linear polypropylene by reaction with peroxydicarbonates in a twin screw extruder. This type of modification is described by A. D. Gotsis et al., *Effect of long chain branching on the processability of polypropylene in thermoforming*, Polymer Engineering and Science, May 2004, vol. 44, No. 5, 973 ff., which shows that melt strength, elasticity and strain hardening increase with the increase of the number of long chain branches on the main chain. The presence of long chain branching in a polymer and thus of the melt strength thereof may be evidenced by the elasticity ratio (ER) of the polymer, which increases with the increase of the melt strength.

WO 99/27007 A1 describes an extrusion process for enhancing the melt strength of polypropylene comprising mixing the polypropylene with at least one peroxydicarbonate, and reacting the polypropylene and peroxydicarbonate at a temperature between 150° C. and 300° C.

However, both peroxidic visbreaking to increase the MFR and reaction of polypropylene with peroxydicarbonate to introduce long chain branching are independently associated with color formation. Color formation is evidenced by an increase of the Yellowness Index (YI). Yellow color is always perceived by users as a quality loss in optical appearance.

Further, it is known that the increase of melt flow rate observed in peroxidic visbreaking is generally obtained at the expense of the elasticity ratio. This undesired effect may be due to the fact that the elasticity ratio is a function not only of long chain branching, but also of the molecular weight distribution and to the fact that peroxidic visbreaking narrows the molecular weight distribution, which is detrimental to the elasticity ratio. Indeed, the elasticity ratio increases with the broadening of the molecular weight distribution. So, since peroxidic visbreaking results in narrowing the molecular weight distribution, peroxidic visbreaking negatively impacts the elasticity ratio. On the other hand, introducing long chain branching has a negative impact on the MFR because the MFR generally decreases with the introduction of long chain branching.

Thus, the known methods for producing polypropylene under extrusion conditions do not allow to obtain polypropylene having an increased MFR and an increased ER while limiting color formation.

In view of the above, there is still the need of developing methods for producing a polypropylene, and in particular a polypropylene copolymer, simply by reaction under extrusion conditions resulting in a polypropylene having an increased melt viscosity and melt strength while maintaining color formation at an acceptable level for users.

SUMMARY OF INVENTION

The Applicant has surprisingly found that by using a composition essentially comprising at least one peroxydicarbonate and at least one organic peroxide and by contacting a propylene copolymer with the composition under extrusion conditions, a propylene copolymer having a unique combination of melt viscosity, melt strength and low color formation may be obtained. This unique combination may be for example desirable in injection foam molding applications. In these applications, flowability is desired for easy filling of narrow-cavity molds in combination with high melt strength permitting to build stable walls of growing foam cells and low color formation to achieve appealing optical properties.

Recently, the inventors tested compositions essentially comprising at least one peroxydicarbonate and at least one organic peroxide in an extrusion process of a propylene copolymer and were surprised to find that such compositions worked significantly and unexpectedly better, in terms of color formation, than would have been predicted. Indeed, a person skilled in the art would have expected that the reaction of a propylene copolymer with a mixture of at least one peroxydicarbonate and at least one organic peroxide would lead to a color formation indicated by a YI at least as high as the sum of the YI resulting from the action exerted by the at least one peroxydicarbonate and the YI resulting from the action exerted by the at least one organic peroxide. In contrast, values of YI lower than the sum of the YI resulting from the action exerted by the at least one peroxydicarbonate and of the YI resulting from the action exerted by the at least one organic peroxide were surprisingly obtained.

According to a first aspect thereof, the present disclosure relates to a method for producing a propylene copolymer, comprising extruding a molten polypropylene and a composition essentially comprising at least one peroxydicarbonate and at least one organic peroxide. The term essentially comprising means that no further component reacting with the propylene copolymer is present in the composition. For example, more peroxydicarbonates and/or more organic peroxide may be present in the composition. Also, one or more diluents and/or one or more polymer additives, such as, for example, stabilizers, acid scavengers, nucleating agents, antistatic agents, slip agents, antiblocking agents, and/or mold release agents, may be also present in the composition. However, components reacting with the propylene copolymer other than peroxydicarbonates and organic peroxides are not present in the composition. So, for example, the composition does not comprise grafting agents. According to one or more embodiments, the composition consists of at least one peroxydicarbonate and at least one organic peroxide.

On the one hand, the selected composition results at least in an attenuation of the negative impact exerted by the narrowing of the molecular weight distribution on the ER caused by the at least one organic peroxide when used alone, the ER decreasing with the narrowing of the molecular weight distribution. On the other hand, the selected composition results at least in an attenuation of the corresponding negative impact exerted by the at least one peroxydicarbonate on the MFR when used alone, the MFR decreasing with caused by the at least one peroxydicarbonate.

Additionally, both effects are attained without the expected color formation.

Accordingly, the propylene copolymer modified according to such a method may present a MFR and a ER which are both higher than the corresponding properties shown by the copolymer before the modification, while presenting, at the same time, a low color formation. Indeed, it was surprisingly found that the YI of a propylene copolymer obtained by using a composition essentially comprising at least one peroxydicarbonate and at least one organic peroxide is well lower than the sum of the YI resulting from the action of the at least one peroxydicarbonate and the YI resulting from the action of the at least one organic peroxide. For example, MFR and ER may be enhanced while maintaining a YI equal to or lower than 6.5.

In the present description and in the following claims, the term "propylene copolymer" is used to indicate a propylene copolymer or propylene copolymer mixtures containing at least 50% by weight of copolymerized propylene.

Extruding a molten propylene copolymer and a composition is intended to indicate extruding a propylene copolymer in the molten state in the presence of the composition. Extruding may be performed in an extruder or in any other melt processing device. In both cases, extruding is performed under extrusion conditions.

According to the present disclosure, extruding a molten propylene copolymer and the composition may be performed by extruding the propylene copolymer, which may be for example in an initial powder or pellet form, adding the above-mentioned composition to the propylene copolymer, and melt extruding the propylene copolymer in the presence of said composition. According to one or more embodiments, adding the composition to the propylene copolymer may be for example performed after the extrusion of the propylene copolymer. According to other embodiments, however, adding the composition to the propylene copolymer may be for example performed before or during the extrusion of the propylene copolymer. In any case, according to the present disclosure, both the at least peroxydicarbonate and the at least one organic peroxide are added in form of a composition, i.e., they are added simultaneously.

Such a method as defined in the first aspect of the disclosure is effective for the rheological modification of propylene copolymer, including polypropylene degradation and/or cross-linking and/or long chain branching, without resulting in unacceptable levels of color.

According to one or more embodiments, the at least one peroxydicarbonate is solid or liquid at room temperature.

According to one or more embodiments, the at least one peroxydicarbonate has a half life in chlorobenzene of one hour or less at a temperature between 55° C. and 75° C. For example, the at least one peroxydicarbonate may have a half life in chlorobenzene of one hour or less, such as from 0.1 h to 1 h, at a temperature between 60° C. and 70° C.

According to one or more embodiments, the at least one organic peroxide is solid or liquid at room temperature.

According to one or more embodiments, the at least one organic peroxide has a half life in chlorobenzene of one hour or less at a temperature between 125° C. and 155° C. For example, the at least one organic peroxide may have a half life in chlorobenzene of one hour or less, such as from 0.1 h to 1 h, at a temperature between 130° C. and 150° C.

When the composition essentially comprises at least one peroxydicarbonate and at least one organic peroxide having these selected kinetics, the propylene copolymer has still more enhanced MFR and ER and limited YI.

Additionally, independently from the type of exemplary compounds used in the composition, by controlling the amount of the at least one organic peroxide and/or of the at least one peroxydicarbonate with respect to the amount of the polypropylene, tailored properties may be obtained which may be selected as a function of the application of the polypropylene.

So, for example, according to one or more embodiments, the composition used in the method of the present disclosure may be added to the propylene copolymer in such a manner that the amount of the at least one organic peroxide with respect to the amount of the propylene copolymer attains a predetermined value. For example, the composition may be added to the propylene copolymer so that the amount of the at least one organic peroxide added to the propylene copolymer ranges from 50 ppm to 2000 ppm with respect to the amount of the propylene copolymer, where ppm of at least one organic peroxide, in the present disclosure and in the following claims, indicates mg of at least one organic peroxide feed/kg of propylene copolymer feed. When the amount of the at least one organic peroxide added to the polypropylene is lower than 50 ppm, visbreaking may be insufficient, while when the amount of the at least one organic peroxide added to the polypropylene is higher than 2000 ppm, an excessive degradation of the propylene copolymer may be observed. For example, when extruding is performed in an extruder, the method, according to one or more embodiments, may further comprise feeding the propylene copolymer and the composition to the extruder so that a predetermined ratio between the at least one organic peroxide-feed and the propylene copolymer-feed (for example from 100 ppm to 1500 ppm, for example from 150 ppm to 1250 ppm, for example of from 200 to 1000 ppm) is attained.

According to one or more embodiments, the composition may be added to the propylene copolymer in such a manner that the amount of the at least one peroxydicarbonate with respect to the amount of the propylene copolymer attains at predetermined value. For example, the composition may be added to the propylene copolymer so that the amount of the at least one peroxydicarbonate added to the polymer ranges from 500 ppm to 50000 ppm with respect to the amount of the propylene copolymer, where ppm of at least one peroxydicarbonate, in the present disclosure and in the following claims, indicates mg of at least one peroxydicarbonate feed/kg of propylene copolymer feed. When the amount of the at least one peroxydicarbonate added to the propylene copolymer is lower than 500 ppm, no substantial effect on the ER is observed, while when the amount of the at least one organic peroxydicarbonate added to the propylene copolymer is higher than 50000 ppm, excessive formation side reactions and discoloring are observed. For example, when extruding is performed in an extruder, the method, according to one or more embodiments, may further comprise feeding the propylene copolymer and the composition to the extruder so that a predetermined ratio between the at least one peroxydicarbonate-feed and the propylene copolymer-feed (for example from 1500 ppm to 30000 ppm, for example from 2500 ppm to 25000 ppm, for example of from 5000 ppm to 20000 ppm) is attained.

According to one or more embodiments, the composition may be added to the propylene copolymer in such a manner that the amount of the composition with respect to the amount of the propylene copolymer attains at a predetermined value. For example, the composition may be added to the polypropylene so that the amount of the composition added to the propylene copolymer ranges from 550 ppm to 52000 ppm with respect to the amount of the propylene copolymer, where ppm of composition, in the present disclosure and in the following claims, indicates mg of composition feed/kg of propylene copolymer feed. For example, when extruding is performed in an extruder, the method, according to one or more embodiments, may further comprise feeding the propylene copolymer and the composition to the extruder so that a predetermined ratio between the composition-feed and the propylene copolymer-feed (for example from 1650 ppm to 31500 ppm, for example from 2650 ppm to 26250 ppm, for example of from 5200 to 21000 ppm) is attained.

According to one or more embodiments, the composition may be added to the propylene copolymer before the extrusion. According to one or more embodiments, the composition may be added to the propylene copolymer during the extrusion.

According to one or more embodiments, the method comprises extruding a molten propylene copolymer in the presence of a composition essentially comprising, for example consisting of, at least one peroxydicarbonate, for example any of the exemplary peroxydicarbonates mentioned below, and at least one organic peroxide, for example any of the exemplary organic peroxides mentioned below.

According to one or more embodiments, the composition comprises 0.1% to 80% by weight of at least one peroxydicarbonate, for example any of the exemplary peroxydicarbonates mentioned below, and 20% to 99% by weight of at least one organic peroxide, for example any of the exemplary organic peroxides mentioned below.

According to one or more embodiments, the at least one peroxydicarbonate and/or the at least one organic peroxide contain a predetermined percentage by weight of active oxygen with respect to the total weight of peroxydicarbonate(s) and with respect to the total weight of organic peroxide(s), respectively.

The active oxygen is the amount of oxygen contained in an organic peroxide molecule that is available for forming free radicals. This is presented as the percentage by weight of one of the elemental oxygens contained in the peroxy group. One of the oxygen atoms in each peroxide group is considered active. In the present description and in the following claims, active oxygen (A[0]) in the at least one organic peroxide/in the at least one peroxydicarbonate is used to indicate the amount of oxygen contained in an organic peroxide/peroxydicarbonate molecule that is the theoretically maximum available for forming free radicals. This value is calculated from the number active oxygen based upon the chemical structure(s) of the organic peroxide(s)/peroxydicarbonate(s) in the mixture, i.e.:

$$A[O](\% \text{ by weight}) = 16p/m \times 100,$$

where
p is the number of peroxide groups in the molecule, and
m is the molecular mass of the organic peroxide/peroxydicarbonate.

According to one or more embodiments, the composition essentially comprises at least one peroxydicarbonate, at least one organic peroxide and one or more additional components, such as for example diluents. Also when the at least one peroxydicarbonate and the at least one organic peroxide are provided in such form, m is the molecular mass of the organic peroxide/peroxydicarbonate, i.e., without the additional components.

According to one or more embodiments, the at least one peroxydicarbonate contains up to 11% by weight of active oxygen with respect to the total weight of peroxydicarbonate(s).

For example, the at least one peroxydicarbonate may contain from 2.0% to 5.0%, for example from 2.3% to 5.0%, for example from 2.5% to 5.0%, for example from 2.3% to 4.5%, for example from 2.6% to 4.0%, by weight of active oxygen with respect to the total weight of organic peroxydicarbonate(s).

According to one or more embodiments, the at least one peroxydicarbonate may have the formula R1-OC(O)OOC(O)O—R2, wherein R1 and R2 are independently selected from the group comprising $CH_3$, $C_2H_5$, $C_3H_7$, $C_4H_9$, $C_5H_{11}$, $C_6H_{13}$, $C_7H_{15}$, $C_8H_{17}$, $C_{10}H_{21}$, $C_{12}H_{25}$, $C_{14}H_{29}$, $C_{18}H_{37}$, $C_2H_5CH(CH_3)$, c-$C_6H_{11}CH_2$, $CH_3CH(OCH_3)$, $C_6H_5OCH_2CH_2$, $C_6H_5CH_2$, Z—$C_8H_{17}CH$=$CH(CH_2)_8$, $(CH_3)_2CHCH_2CH(CH_3)$, $[C_2H_5OC(O)]_2CH(CH_3)$, 2-oxo-1,3-dioxolan-4-$CH_2$, i-$C_4H_9$, $H_2C=CHC(O)OCH_2CH_2$, $C_4H_9CH(C_2H_5)CH_2$, $H_2C=CHCH_2$, $H_2C=C(CH_3)CH_2$, c-$C_6H_{11}$, 4-$[C_6H_5-N=N]-C_6H_4CH_2$, $C_{16}H_{33}$, $CH_3OCH_2CH_2$, $H_2C=C(CH_3)$, $C_2H_5OCH_2CH_2$, $H_2C=CH$, i-$C_3H_7$, c-$C_{12}H_{23}$, $CH_3OCH_2CH_2$, $C_6H_{13}CH(CH_3)$, $(CH_3)C(CH_3)_2CH_2CH_2$, $C_3H_7OCH_2CH_2$, $CH_3OCH_2CH(CH_3)$, 2-i-$C_3H_7$-5-$CH_3$-c-$C_6H_9$, $C_4H_9OCH_2CH_2$, t-$C_4H_9$, and $(CH_3)_3CCH_2$, wherein i=iso, t=tertiary, Z=cis, and c=cyclic.

Optionally, a combination of peroxydicarbonates may be used.

According to one or more embodiments, the at least one peroxydicarbonate may be selected from the group comprising dicetyl peroxydicarbonate, bis(4-tert-butylcyclohexyl) peroxydicarbonate, dimyristyl peroxydicarbonate and combinations thereof.

According to one or more embodiments, the at least one organic peroxide contains at least 5%, for example more than 8%, by weight of active oxygen with respect to the total weight of organic peroxide(s). For example, the at least one organic peroxide may contain from 8% to 23%, for example from 8% to 22%, for example from 8% to 21%, for example from 9% to 22%, for example from 9% to 21%, for example from 9% to 20%, for example from 9% to 15%, by weight of active oxygen with respect to the total weight of organic peroxide(s).

According to one or more embodiments, the at least one organic peroxide is different from the at least one peroxydicarbonate.

According to one or more embodiments, the at least one organic peroxide comprises at least one dialkyl peroxide.

According to one or more embodiments, the at least one organic peroxide is selected from the group comprising 2,5-dimethyl-2,5-di(t-butylperoxy)hexane, 2,5-dimethyl-2,5-di(tert-butylperoxy)hexyne-3, di(tert-butyl) peroxide, di(tert-amyl) peroxide; tert-butyl cumyl peroxide, di(tert-butylperoxy-isopropyl)-benzene, dicumyl peroxide, 3,6,9-triethyl-3,6,9-trimethyl-1,4,7-triperoxonane, 3,6,9-trimethyl-3,6,9-tris(ethyl and/or propyl)-1,4,7-triperoxonane, 3,3,5,7,7-pentamethyl-1,2,4-trioxepane, substituted 1,2,4-trioxacycloheptanes and combinations thereof.

According to one or more embodiments, the at least one organic peroxide is selected from the group comprising 2,5-dimethyl-2,5-di(t-butylperoxy)hexane, 3,6,9-triethyl-3,6,9-trimethyl-1,4,7-triperoxonane, 3,6,9-trimethyl-3,6,9-tris(ethyl and/or propyl)-1,4,7-triperoxonane, di(tert-butyl) peroxide and combinations thereof.

According to one or more embodiments, the composition essentially comprising at least one peroxydicarbonate and at least one organic peroxide may further comprise stabilizers, acid scavengers, nucleating agents, antistatic agents, slip agents, antiblocking agents, and/or mold release agents.

According to one or more embodiments, the method comprises extruding a molten propylene copolymer in the presence of a composition essentially comprising, for example consisting, of at least one peroxydicarbonate and at least one organic peroxide and at least one optional stabilizer.

According to one or more embodiments, the composition may be prepared by adding at least one peroxydicarbonate to at least one organic peroxide or viceversa. For example, when more than one peroxydicarbonate is used, a plurality of peroxydicarbonates may be first combined together and then added to at least one organic peroxide. When more than one organic peroxide is used, a plurality of organic peroxides may be first combined together before the peroxydicarbonate(s) is(are) added.

According to one or more embodiments, extruding may be performed in the presence of one or more polymer additives. Exemplary additives may comprise, for example, fillers, antioxidants, fungicides, bactericides, reinforcing agents, antistatic agents, heat stabilizers, UV-stabilizers, flow enhancers, colorants and other additives or processing aids known to those skilled in the art.

According to one or more embodiments, extruding may be performed in an extruder at predetermined extrusion conditions suitable for extruding a propylene copolymer, such as for example at a predetermined extrusion temperature and at a predetermined extrusion pressure. With reference to an extruder, unless otherwise indicated, in the present description and in the following claims the exemplary extrusion temperatures and pressures are intended to indicate the barrel temperatures and pressures.

Depending on the polymer MFR, the extruder throughput and screw design, extruding may be for example performed at an extrusion temperature of from 150° C. to 300° C., for example from 160° C. to 250° C., for example from 170° C. to 240° C., and for example from 180° C. to 220° C.

According to one or more embodiments, the extrusion conditions may vary along the length of the extruder. For example, the extrusion temperature may increase or decrease along at least a portion of an extrusion path, which may extend along different extruder zones.

According to one or more embodiments, in each extruder zone, the temperature may be set within a predetermined temperature range.

According to one or more embodiments, the extruder may comprise, in the order, a feed zone, a solid conveying zone, a solid compression zone, a melting zone, a melt conveying zone, at least one decompression zone, a melt compression zone and a die zone. The feed zone feeds the propylene copolymer powder or pellets into the extruder and may be kept at a predetermined temperature to avoid that the propylene copolymer powder or pellets becomes sticky or melts and to ensure that the peroxide does not start reacting. The solid conveying zone transports the propylene copolymer powder or pellets towards the compression zone. The solid compression zone pressurizes the propylene copolymer powder or pellets, while most of the propylene copolymer is melted in the melting zone, and the melt conveying zone melts the last propylene copolymer particles and mixes to a uniform temperature and composition. The at least one decompression zone allows the molten propylene copolymer to be decompressed. The melt compression zone pressurizes the propylene copolymer melt, and the die zone forms the molten propylene copolymer into the desired shape for collection.

According to one or more embodiments, the extruder may also comprise a further melting and/or a further compression zone arranged downstream of the at least one decompression zone and a further melt conveying zone arranged downstream of the further melting zone. The further compression zone may serve to repressurize the melt to get the melt through the resistance of the screens and the die, and the further melt conveying zone may serve to further mix to a uniform temperature and composition.

According to one or more embodiments, the extruder may comprise two decompression zones. The two decompression zones may be separated by a mixing zone or may be immediately adjacent decompression zones.

According to one or more embodiments, extruding is performed at a temperature of from 30° C. to 200° C., for example from 30° C. to 50° C., in the extruder feed zone.

According to one or more embodiments, extruding is performed at a temperature of from 160° C. to 220° C. in the extruder solid conveying zone.

According to one or more embodiments, extruding is performed at a temperature of from 180° C. to 240° C. in the extruder solid compression zone.

According to one or more embodiments, extruding is performed at a temperature of from 210° C. to 280° C. in the extruder melting zone.

According to one or more embodiments, extruding is performed at a temperature of from 210° C. to 260° C. in the extruder melt conveying zone.

According to one or more embodiments, extruding is performed at a temperature of from 210° C. to 260° C. in the extruder decompression zone.

According to one or more embodiments, extruding is performed at a temperature of from 180° C. to 260° C. in the extruder melt compression zone.

According to one or more embodiments, extruding is performed at a temperature of from 180° C. to 280° C. in the extruder die zone.

According to one or more embodiments, the temperature profile along the extruder may comprise a combination of one or more of these exemplary ranges of temperatures in the different zones of the extruder.

According to one or more embodiments, the extrusion conditions may comprise, for example, a feed zone temperature of from 30° C. to 200° C., for example from 30° C. to 50° C., a solid conveying zone of from 180° C. to 220° C., a solid compression zone of from 180° C. to 220° C., a melting zone temperature of from 210° C. to 280° C., a melt conveying zone of from 210° C. to 260° C., a decompression zone temperature of from 210° C. to 260° C., a melt compression zone temperature of from 210° to 260° C., and a die zone temperature of from 180° to 280° C.

According to one or more embodiments, the extrusion conditions may vary before and after the introduction of the composition in the extruder. For example, the extrusion conditions may comprise a first temperature profile before the introduction of the composition into the extruder and a second, different temperature profile after the introduction of the composition into the extruder. For example, both profiles may have any of the exemplary values defined above. Independently from or in combination with a possible variation of the temperature along the length of the extruder, also the extrusion pressure may vary along the length of the extruder. For example, the extrusion conditions may comprise a feed zone pressure of 1 bar (atmospheric pressure) and a melt compression zone of from 30 bar to 150 bar. The remaining zones may have pressures intermediate to the exemplary pressures of the feed zone and of the melt compression zone.

The extrusion conditions may further comprise an intensive mixing in the extruder. According to one or more embodiments, sufficient mixing may be obtained by setting the circumferential screw speed of the extruder within the range of from 2 m/s to 6 m/s.

According to one or more embodiments, the at least one decompression zone may comprise a venting zone, for example including at least one vent port or a plurality of vent ports. The at least one decompression zone may, for example, be arranged about two-thirds down the extruder screw. The decompression zone allows gases, such as volatiles, to escape from the molten polypropylene through the venting zone, for example through one or more vent ports provided in the venting zone.

However, high quality propylene copolymer as described above may be obtained even without venting the extruder through vent or vacuum ports and without establishing a predetermined vacuum in an extruder venting zone.

According to one or more embodiments, the propylene copolymer may be selected from the group comprising copolymers of propylene with other olefins such as ethylene, 1-butene, 2-butene and pentene isomers, and for example copolymers of propylene with ethylene.

According to one or more embodiments, the propylene copolymer may be a random propylene copolymer, an impact propylene copolymer, a terpolymer of propylene, and combinations thereof. Random propylene copolymers, also known as statistical propylene copolymers, are polymers in which the propylene and the comonomer(s) are randomly distributed throughout the polymeric chain in ratios corresponding to the feed ratio of the propylene to the comonomer(s). Impact copolymers, also known as heterophasic copolymers, comprise a propylene homopolymer or copolymer matrix in which a propylene copolymer is dispersed. For example, heterophasic copolymers may contain up to 40 wt % ethylene-propylene rubber (EPR), intimately dispersed within a matrix, for example made of a homopolymer. Terpolymers of propylene may comprise copolymers of propylene with ethylene and one other olefin.

Random copolymers and impact copolymers may be manufactured by any known process.

According to one or more embodiments, the propylene copolymer, before being modified with any of the embodiments of the composition, may have an initial MFR, measured according to ISO 1133 with a load of 2.16 kg at 230° C., of about 0.2 to about 100 g/10 min, for example from 0.2 to 50 g/10 min, for example from 0.2 to 20 g/10 min.

In the following description and claims, if not otherwise indicated, the MFR is a MFR measured according to ISO 1133 with a load of 2.16 kg at 230° C.

According to one or more embodiments, the propylene copolymer, after the modification with any of the embodiments of the composition, may have a final MFR of up to 5000% higher than the initial MFR. According to one or more embodiments, the final MFR may be of from 50 to 2000 g/10 min, for example of from 20 to 100 g/10 min, for example of from 5 to 30 g/10 min.

According to one or more embodiments, propylene copolymer powder or pellets and the composition may be fed into the extruder, which may be for example a single or twin-screw extruder, separately or in combination.

When fed in combination, the propylene copolymer powder or pellets and the composition may be optionally pre-mixed, for example at a temperature of from 30° C. to 40° C.

The propylene copolymer powder or pellets and the composition may be fed separately into the extruder at predetermined feed rates. For example, the feed rate of the propylene copolymer may be set within the range of 2 to 500 kg/h for lab extruders and within the range of 5 to 100 tons/h for industrial extruders, and the feed rate of the composition may be adjusted to obtain a final pellet having a desired MFR.

According to one or more embodiments, the composition, when fed separately from the propylene copolymer, may be added to the extruder in a continuous manner or in a discontinuous manner, stepwise or gradually. For example, the composition may be added to the extruder according to a predetermined frequency.

According to one or more embodiments, the temperatures of the different zones of the extruder, which may have the above-mentioned exemplary ranges of temperatures in a steady state, may be set at lower values, before the composition is introduced. For example, the temperatures of the different zones of the extruder may be set within ranges of temperatures which are at least 10° C.-20° C. lower than the corresponding steady-state extrusion temperatures. However, the composition may be also introduced after the temperatures of the different zones of the extruder have attained the steady-state ranges of temperatures.

According to one or more embodiments, the composition feed rate into the extruder may be gradually increased up to a predetermined value, which may change as a function of the desired final MFR of the pellet. The final MFR may be measured by means of an online rheometer, for example mounted on the die zone of the extruder.

Before increasing the composition feed rate into the extruder to a steady-state value, the temperatures of the barrel and die may be either maintained at the same temperatures set before the composition is introduced or may be further reduced, for example of further 10° C.-20° C.

According to one or more embodiments, the method may further comprise introducing water in the extruder. In this manner, enhanced uniform deactivation of any active catalyst sites may be obtained.

According to a further aspect thereof, the present disclosure relates to a propylene copolymer composition obtained by one or more of the embodiments of the method defined above.

The propylene copolymer composition may be used to prepare different product applications, such as for example foaming, injection foaming, extrusion foaming, thermoforming, extrusion coating or blow molding applications.

According to a further aspect thereof, the present disclosure relates to the use of a composition essentially comprising at least one peroxydicarbonate and at least one organic peroxide for controlling the YI in a propylene copolymer under extrusion conditions.

For example, in the above-mentioned use, the composition may be used in an extruder under one or more of the extrusion conditions defined above with reference to the method. The composition and the propylene copolymer may be any of the exemplary compositions and propylene copolymers described above.

According to a further aspect thereof, the present disclosure relates to a branched propylene copolymer having a MFR of at least 20.0 g/10 min, an ER of at least 1.2 dyn/cm$^2$ and a YI lower than 6.5, for example lower than 6.2.

According to one or more embodiments, the MFR may be of at least 20.0 g/10 min, the ER may be of at least 1.5 dyn/cm$^2$, for example of at least 1.5 dyn/cm$^2$, and the YI may be lower than 6.2, for example lower than 6.0.

According to one or more embodiments, MFR is of at least 20.0 g/10 min and ER is greater than 2 dyn/cm$^2$. In any of these embodiments, the YI may be for example lower than 7, for example lower than 6.5, for example lower than 6.0.

According to one or more embodiments, the branched propylene copolymer may be any of the exemplary copolymers mentioned above.

Further embodiments are defined in the dependent claims.

DESCRIPTION OF EMBODIMENTS

The following examples of methods for producing a propylene copolymer are given for illustrating but not limiting purposes.

The examples show the improved combination of properties of propylene copolymers produced by methods according to embodiments of the present disclosure.

The examples also show the improved combination of properties of propylene copolymers produced by methods according to embodiments of the present disclosure compared to conventional methods using only organic peroxide and to conventional methods using only peroxydicarbonate. The examples show high MFR and ER and low YI in propylene copolymers produced in accordance with embodiments of the method of the present disclosure.

In the following examples, compositions will be described for producing a propylene impact copolymer under extrusion conditions. However, different propylene copolymers from these exemplary copolymers may be produced by the method of the present disclosure.

Also, compositions will be described comprising one organic peroxide and one peroxydicarbonate. However, a plurality of organic peroxides and/or a plurality of peroxydicarbonates may be used in accordance with one or more embodiments of the method of the present disclosure. Further, also stabilizers and/or additional additives may be used in accordance with one or more embodiments of the method of the present disclosure.

Each exemplary composition at a predetermined concentration was fed with exemplary copolymer pellets through a hopper directly into an extruder comprising a vent port. However, as shown in the examples, venting is optional and is not essential to obtain the improved combination of propylene copolymers properties. Together with the composition and the propylene copolymers pellets, any stabilizers and/or additional additives may be also fed through the hopper into the extruder.

The exemplary propylene copolymer and the composition were extruded in the extruder at an extrusion temperature which was varied along the length of the extruder. In particular, the extrusion temperature was adjusted to 180° C. at the extruder feed zone and increased up to 200° C. at the extruder die zone.

The propylene copolymer and the composition were mixed by the screw of the extruder. During the transportation of the propylene copolymer through the extruder, propylene copolymer degradation occurred. Volatile compounds were removed during the extrusion by venting the extruder applying under-atmospheric pressure.

As shown in the following, the method according to embodiments of the present disclosure resulted in final propylene copolymer pellets having high MFR and ER and low YI.

The following methods were used to determine the properties reported in the examples and in any of the embodiments of the present disclosure making reference to these properties.

Melt Flow Rate (MFR) is the MFR measured according to ISO 1133 with a load of 2.16 kg at 230° C.

The $C_2$ content is measured based on Fourier Transform Infrared Spectroscopy (FTIR) calibrated with 13C-NMR, using Bruker Tensor 27 instrument with Bruker OPUS software.

Color formation during the production of the propylene copolymer is determined by the Yellowness Index (YI) of the propylene copolymer pellets. To determine the Yellowness Index, a color determination according to ASTM D6290 with a Group I Spectrophotometer, the LabScan XE from Hunterlab, with a D65/10° arrangement of Illuminant/Observer is performed. A sample cup is filled to the top with pellets, placed on the sensor port and covered with an opaque and light excluding cover. The measurement delivers the Tristimulus values X, Y and Z. The calculation of the Yellowness Index is done according to ASTM E313 by the following equation: YI=100 (Cx X−Cz Z)/Y, where the coefficients Cx and Cz are selected according to the setting of Illuminant and Observer used for the measurement of the Tristimulus values. For Illuminant D65 and Observer 10°, Cx is 1.3013 and Cz is 1.1498.

The Polydispersity Index (PI) and the Elasticity Ratio (ER) are determined by rheology using a dynamic oscillatory shear test, e.g. Dynamic Oscillatory Rate Sweep (DORS). A sample in the form of a compression molded disk is loaded between a parallel plate-to-plate geometry. The measurements are performed at 210° C. in a frequency range between 0.1 rad/s and 400 rad/s. The Polydispersity Index (PI), which is a measure of the molecular weight distribution, is calculated according the following equation: $PI=10^5$ Pa/Gc, where Gc is the cross over modulus obtained from the dynamic oscillatory shear measurement (where dynamic storage modulus G'=dynamic loss modulus G" at the crossover frequency). The ER is defined as $1.781*10^{-3}*G'$ (at G"=500 Pa).

Tensile modulus is measured according to ISO527-2 (cross head speed=50 mm/min, 23° C.) using an injection molded test specimen as described in ISO 1873-2.

The melting temperature ($T_m$) and the crystallization temperature ($T_c$) are determined via differential scanning calorimetry (DSC): heating and cooling rate is 10° C./min, the temperature ramp from 25° C. to 200° C., 200° C. to 25° C. and 25° C. to 200° C. including 5 min isotheral annealing at 200° C. and 25° C. The thermal properties are read out from the thermogram obtained from the last temperature ramp.

Charpy notched impact strength is determined according to ISO 179/1 eA at 23° C., 0° C., −20° C., −30° C. by using an injection molded test specimen as described in ISO 1873-2.

Examples 1-4

Examples 1-4 show the improved combination of properties of a propylene copolymer produced by a method according to embodiments of the present disclosure compared to a corresponding propylene copolymer produced by a conventional method using no peroxides at all, a propylene copolymer produced by a conventional method using only organic peroxide and to a conventional method using only peroxydicarbonate.

The polymer used in Examples 1-4 was ICP-1, a commercial heterophasic propylene copolymer produced in a Novolen plant in pellet form with a MFR of 9.2 g/10 min, containing an additive package consisting of 450 ppm tris(2,4-di-tert-butylphenyl)phosphite, 450 ppm of pentaerythritol tetrakis(3-(3,5-di-tert-butyl-4-hydroxyphenyl) propionate), 800 ppm calcium stearate and 3500 ppm of talc.

Example 1 is a control example, in which the polypropylene was not treated with any composition.

The organic peroxide used in comparative Example 2 and in Example 4 was 2,5-dimethyl-2,5-di(tert-butylperoxy) hexane. 2,5-Dimethyl-2,5-di(tert-butylperoxy)hexane contains 11.02% by weight of active oxygen with respect to the total weight of organic peroxide and has a half life in chlorobenzene of 1 hour at a temperature of 134° C. as described in the brochure of Akzo Nobel Initiators for High Polymer, 2161 BTB Communications, Issue June 2006. For the preparation of comparative Example 2 and Example 4, the commercially available 2,5-dimethyl-2,5-di(tert-butylp-eroxy)hexane grade Luperox 101PP20 from Arkema, which contains 20% of the 2,5-dimethyl-2,5-di(tert-butylperoxy) hexane on a PP carrier resin, was used.

The peroxydicarbonate used in comparative Example 3 and in Example 4 was dicetyl peroxydicarbonate. Dicetyl peroxydicarbonate contains 2.80% by weight of active oxygen with respect to the total weight of peroxydicarbonate and has a half life in chlorobenzene of 1 hour at a temperature of 65° C. as described in the brochure of Akzo Nobel Initiators for High Polymer, 2161BTB Communications, Issue June 2006. For the preparation of comparative Example 3 and Example 4 the commercially available dicetyl peroxydicarbonate grade Perkadox 24L from Akzo Nobel having a purity of 91% was used.

Comparative Example 2 was performed by reactive extrusion of the heterophasic propylene copolymer of Example 1 with 2000 ppm Luperox 101PP20 (containing 400 ppm pure organic peroxide Luperox 101).

Comparative Example 3 was performed by reactive extrusion of the heterophasic propylene copolymer of Example 1 with 1 wt % Perkadox P24L.

Example 4 according to an embodiment of the present disclosure was performed by reactive extrusion of the heterophasic propylene copolymer used in Example 1 with 2000 ppm Luperox 101PP20 (containing 400 ppm pure organic peroxide Luperox 101) and 1 wt % Perkadox P24L.

All Examples 1-4 were performed under the same conditions, as detailed in the following.

In all examples, the propylene copolymer pellets and a respective composition, when present, were fed in the hopper of a twin screw extruder from Brabender with an L/D (extruder Length/screw Diameter) of 20 and provided with a vent port in a decompression zone of the extruder.

The feed rate of the polypropylene pellets was 3 kg/h. Volatile compounds were removed during the extrusion by applying under-atmospheric pressure (vacuum) on the vent port. The vacuum applied on the vent port was set to 400 mbar.

The extrusion temperature was adjusted to 180° C. at the extruder feed zone and increased up to 200° C. at the extruder die zone.

Table 1 shows detailed data of the evaluation using, as a copolymer, the above-mentioned ICP-1.

TABLE 1

|  | 1 (control) | 2 (comparative) | 3 (comparative) | 4 (disclosure) |
|---|---|---|---|---|
| Copolymer Composition | ICP-1 — | ICP-1 400 ppm Luperox 101 | ICP-1 1 wt % P24L | ICP-1 400 ppm Luperox 101 + 1 wt % P24L |
| MFR 2.16 [g/10 min] | 9.2 | 26.2 | 8.5 | 22.2 |
| $C_2$ content [wt %] | 10.1 | 10.1 | 10.5 | 10.4 |
| YI [—] | 4.1 | 4.8 | 8.1 | 5.9 |
| PI [—] | 2.6 | 2.5 | 3.0 | 2.6 |
| ER [dyn/cm$^2$] | 1.1 | 0.9 | 2.6 | 2.6 |
| Tensile Modulus [MPa] | 1044 | 1031 | 1075 | 1061 |
| $T_m$ [° C.] | 165 | 164 | 165 | 164 |
| $T_c$ [° C.] | 122 | 122 | 126 | 125 |
| Charpy N 23° C. [kJ/m$^2$] | 55.7 | 48.7 | 59.7 | 52.2 |
| Charpy N 0° C. [kJ/m$^2$] | 9.9 | 9.2 | 14.6 | 11.5 |
| Charpy N −20° C. [kJ/m$^2$] | 6.7 | 5.9 | 8.6 | 6.8 |

TABLE 1-continued

| | 1 (control) | 2 (comparative) | 3 (comparative) | 4 (disclosure) |
|---|---|---|---|---|
| Charpy N −30° C [kJ/m$^2$] | 5.7 | 5.4 | 7.9 | 6.3 |

After reactive extrusion of the heterophasic propylene copolymer having a starting MFR value of 9.2 g/10 min, a starting Yellowness Index of 4.1 and a starting Elasticity Ratio of 1.1 dyn/cm$^2$, by performing a method in accordance with embodiments of the present disclosure, namely by using a mixture of organic peroxide and peroxydicarbonate as in Example 4, the MFR, and thus the flowability, of the propylene copolymer increased to 22.2 g/10 min. Also, the Elasticity Ratio, and thus the melt strength, of the propylene copolymer increased to 2.6 dyn/cm$^2$. However, color formation was much less than expected. Indeed, the value of the Yellowness Index of Example 4 indicates only a slightly increase when compared to the Yellowness Index of Example 2, while a person skilled in the art would expect that the Yellowness Index of Example 4 would be at least as high as after the reaction of the propylene copolymer used in Example 1 with the peroxydicarbonate alone, as in Example 3. This lower color formation of Example 4 shows improved performance of the method according to the present disclosure.

While the method has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for producing a propylene copolymer, comprising extruding a molten propylene copolymer and a composition essentially comprising at least one peroxydicarbonate and at least one other organic peroxide, wherein extruding is performed by extruding the propylene copolymer, adding the composition to the propylene copolymer, and melt extruding the propylene copolymer in the presence of the composition,
   wherein the propylene copolymer melt extruded in the presence of the composition presents a melt flow rate (MFR) higher than the MFR presented by the propylene copolymer before the extrusion, and
   wherein the propylene copolymer melt extruded in the presence of the composition presents an elasticity ratio (ER) higher than the ER presented by the propylene copolymer before the extrusion.

2. The method of claim 1, wherein adding the composition to the propylene copolymer is performed after the extrusion of the propylene copolymer.

3. The method of claim 1, wherein adding the composition to the propylene copolymer is performed before or during the extrusion of the propylene copolymer.

4. The method of claim 1, wherein the at least one other organic peroxide has a half life in chlorobenzene of one hour or less at a temperature between 125° C. and 155° C.

5. The method of claim 1, wherein the at least one other organic peroxide contains at least 5% by weight of active oxygen with respect to the total weight of organic peroxide(s).

6. The method of claim 1, wherein the at least one other organic peroxide comprises at least one dialkyl peroxide.

7. The method of claim 6, wherein at least one other organic peroxide is selected from the group comprising 2,5-dimethyl-2,5-di(t-butylperoxy)hexane, 2,5-dimethyl-2,5-di(tert-butylperoxy)hexyne-3, di(tert-butyl) peroxide, di(tert-amyl) peroxide; tert-butyl cumyl peroxide, di(tert-butylperoxy-isopropyl)-benzene, di cumyl peroxide, 3,6,9-tri ethyl-3,6,9-trim ethyl-1,4,7-triperoxonane, 3,6,9-trim ethyl-3,6,9-tris(ethyl and/or propyl)-1,4,7-triperoxonane, 3,3,5,7,7-pentamethyl-1,2,4-trioxepane, substituted 1,2,4-trioxacycloheptanes and combinations thereof.

8. The method of claim 7, wherein at least one other organic peroxide is selected from the group comprising 2,5-dimethyl-2,5-di(t-butylperoxy)hexane, di(tert-butyl) peroxide, 3,6,9-tri ethyl-3,6,9-trimethyl-1,4,7-triperoxonane, 3,6,9-tri methyl-3,6,9-tris(ethyl and/or propyl)-1,4,7-triperoxonane and combinations thereof.

9. The method of claim 1, wherein the at least one peroxydicarbonate has a half life in chlorobenzene of one hour or less at a temperature between 55° C. and 75° C.

10. The method of claim 1, wherein the at least one peroxydicarbonate contains up to 11% by weight of active oxygen with respect to the total weight of peroxydicarbonate(s).

11. The method of claim 1, wherein the at least one peroxydicarbonate has the formula R1-OC(O)OOC(O)O—R2, wherein R1 and R2 are independently selected from the group comprising CH$_3$, C$_2$H$_5$, C$_3$H$_7$, C$_4$H$_9$, C$_5$H$_{11}$, C$_6$H$_{13}$, C$_7$H$_{15}$, C$_8$H$_{17}$, C$_{10}$H$_{21}$, C$_{12}$H$_{25}$, C$_{14}$H$_{29}$, C$_{18}$H$_{37}$, C$_2$H$_5$CH (CH$_3$), c-C$_6$H$_{11}$CH$_2$, CH$_3$CH(OCH$_3$), C$_6$H$_5$OCH$_2$CH$_2$, C$_6$H$_5$CH$_2$, Z—C$_8$H$_{17}$CH=CH(CH$_2$)$_8$, (CH$_3$)$_2$CHCH$_2$CH (CH$_3$), [C$_2$H$_5$OC(O)]$_2$CH(CH$_3$), 2-oxo-1,3-dioxolan-4-CH$_2$, i-C$_4$H$_9$, H$_2$C=CHC(O)OCH$_2$CH$_2$, C$_4$H$_9$CH(C$_2$H$_5$) CH$_2$, H$_2$C=CHCH$_2$, H$_2$C=C(CH$_3$)CH$_2$, c-C$_6$H$_{11}$, 4-[C$_6$H$_5$—N=N]—C$_6$H$_4$CH$_2$, C$_{16}$H$_{33}$, CH$_3$OCH$_2$CH$_2$, H$_2$C=C(CH$_3$), C$_2$H$_5$OCH$_2$CH$_2$, H$_2$C=CH, i-C$_3$H$_7$, c-C$_{12}$H$_{23}$, CH$_3$OCH$_2$CH$_2$, C$_6$H$_{13}$CH(CH$_3$), (CH$_3$)C(CH$_3$)$_2$ CH$_2$CH$_2$, C$_3$H$_7$OCH$_2$CH$_2$, CH$_3$OCH$_2$CH(CH$_3$), 2-i-C$_3$H$_7$-5-CH3-c-C$_6$H$_9$, C$_4$H$_9$OCH$_2$CH$_2$, t-C$_4$H$_9$, (CH$_3$)$_3$CCH$_2$ and combinations thereof, wherein i=iso, t=tertiary, Z=cis, and c=cyclic.

12. The method of claim 11, wherein the at least one peroxydicarbonate is selected from the group comprising dicetyl peroxydicarbonate, bis(4-tert-butylcyclohexyl) peroxydicarbonate, dimyristyl peroxydicarbonate and combinations thereof.

13. The method of claim 12, wherein the at least one peroxydicarbonate is dicetyl peroxydicarbonate.

14. The method of claim 1, wherein the composition comprises 20% to 99% by weight of the at least one other organic peroxide and 0.1% to 80% by weight of the at least one peroxydicarbonate.

15. The method of claim 1, the method further comprising feeding the copolymer and the composition so that the amount of the at least one organic peroxide feed ranges from 50 ppm to 2000 ppm with respect to the amount of the copolymer feed.

16. The method of claim 1, the method further comprising feeding the copolymer and the composition so that the amount of the peroxydicarbonate feed ranges from 500 ppm to 50000 ppm with respect to the amount of the copolymer feed.

17. The method of claim 1, wherein extruding is performed at an extrusion temperature of from 150° C. to 300° C.

18. The method of claim 1, wherein the propylene copolymer is selected from the group comprising random propylene copolymers, impact propylene copolymers, terpolymers of propylene and combinations thereof.

19. The method of claim 18, wherein the propylene copolymer is an impact propylene copolymer.

20. A propylene copolymer composition obtained by the method of claim 1.

21. A branched propylene copolymer obtained by the method of claim 1, wherein the branched propylene copolymer has a MFR of at least 20.0 g/10 min, and an ER of at least 1.2 dyn/cm$^2$ and a YI lower than 6.5.

22. The branched propylene copolymer of claim 21, wherein the ER is greater than 2 dyn/cm$^2$.

* * * * *